Jan. 31, 1956 W. P. LUTHER 2,733,052
CLOSURE FOR MIXING VESSEL
Filed July 9, 1954
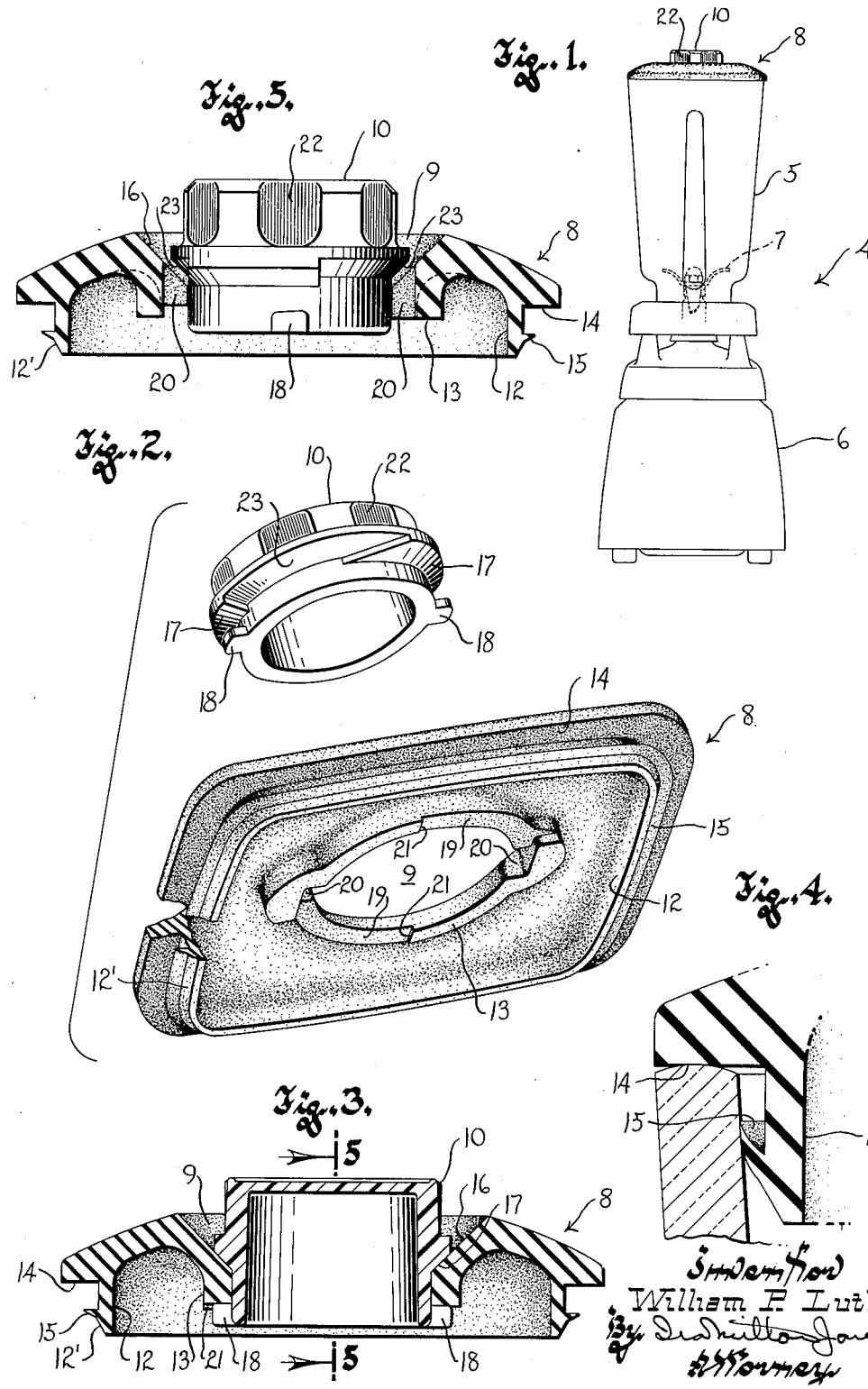

United States Patent Office 2,733,052
Patented Jan. 31, 1956

2,733,052

CLOSURE FOR MIXING VESSEL

William P. Luther, Racine, Wis., assignor to John Oster Manufacturing Company, Milwaukee, Wis., a corporation of Wisconsin Application July 9, 1954, Serial No. 442,277

2 Claims. (Cl. 259—122)

This invention relates to mixing vessels of the type used on food comminuting and blending machines and refers more particularly to a closure or cover for such vessels.

In food comminuting and blending machines of the type having an agitator consisting of a pair of cutters or knives rotatable on a vertical axis at the bottom of a tall, narrow mixing vessel the fast turning cutters tend to throw the vessel contents out of the top thereof so that some sort of cover must be provided, and experience has shown that the cover must fit tightly. However, since the vessels are preferably and usually made of glass, the size and shape of their open upper ends is not reliably uniform and this complicates the problem of providing a suitably tight fitting cover.

The present invention achieves this objective by providing a cover which adapts itself to the mouth of the vessel with a liquid tight fit despite the inevitable variations from the intended size and shape of the vessel.

More specifically, it is an object of this invention to provide a mixing vessel closure of the character described having an integral gasket-forming flange thereon by which a good seal is formed between the cover or closure and the walls of the mixing vessel on which the cover is placed even though the size and shape of the mouth of the vessel may be somewhat different than intended, and which closure may nevertheless be readily installed on and removed from the mixing vessel.

Another object of this invention resides in the provision of a mixing vessel cover of the character described having a central access port or aperture at the bottom of a funnel-like conical depression to facilitate the addition of ingredients to the mixture in the vessel during the comminuting and blending process, which aperture may be closed by a cup-like plug that may also be employed as a measuring cup.

Still another object of this invention is to provide a cover or closure for a mixing vessel of the character described which has an access port or hole therein and an underside so shaped that materials thrown upwardly along the walls of the vessel will be deflected downwardly away from the access port or hole so that the port may be opened to admit material into the vessel while the machine is in operation.

A further object of this invention resides in the provision of a closure for the mixing vessel of a food comminuting and blending machine comprising a cover member having a central access port or aperture and a plug for closing the same, which closure has breather vents providing somewhat tortuous ducts to vent the interior of the vessel while preventing the expulsion of material therefrom, the vents being defined by cooperating and facing wall portions of the cover member and the plug so as to be readily accessible for cleaning.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of a food blending and comminuting machine provided with a closure embodying this invention;

Figure 2 is a perspective view of the cover member of this invention and the plug for its central aperture shown separated from one another, a portion of the cover member being broken away and in section;

Figure 3 is a vertical sectional view through the closure of this invention with its plug in place;

Figure 4 is an enlarged fragmentary sectional view through a portion of the closure in place on a mixing vessel to illustrate the manner in which the desired liquid tight seal is effected; and Figure 5 is a cross sectional view taken on the plane of the line 5—5 in Figure 3, to illustrate the manner in which the vents are provided.

Referring more particularly to the accompanying drawing, the numeral 4 designates generally a food comminuting and blending machine of a well-known type comprising a mixing vessel 5 removably mounted on a base 6 which houses an electric motor (not shown). The motor rotates on a vertical axis and upon proper placement of the vessel is drivingly coupled with an agitator 7 located in the bottom of the mixing vessel.

As is customary, the agitator comprises a set of cutter blades so shaped that during operation they not only comminute solid material contained in the vessel, but in coaction with the shape of the vessel, impart a toroidal movement of flow to the contents of the vessel, upwardly along the walls of the vessel toward the mouth thereof and downwardly at the center. Despite the relatively high walls of the vessel its contents are very apt to be forcibly expelled especially when the agitator is first turned on unless the top of the vessel is closed by a suitable cover.

The cover or closure of this invention comprises in general a disc-like member 8 having a central aperture 9 therein and an inverted cup-shaped plug 10 fitted into the aperture to close the same.

The cover member is preferably molded in one piece from a resilient material such as neoprene, it being understood that any material from which it is made should be odorless, tasteless, non-absorbent and unaffected by foods, fruit acids and alcohol. The cover member is so shaped that its outline corresponds closely to the configuration of the top of the mixing vessel, and in cross section it has an inverted dished shape with a side wall 12 which fits into the mouth of the mixing vessel, the lower edge of the side wall being tapered as at 12' to facilitate application of the cover member to the mixing vessel. The underside of the cover is concave and merges with the side wall 12 and a central depending boss 13 through which the port or aperture 9 opens. A flat bottom flange 14 encircles the side wall above its tapered lower edge to seat upon the rim of the vessel and support the cover member against dropping into the vessel.

Neoprene or any other material from which the cover would be made can be quite accurately molded to any given size and shape, but the vessel, being made of glass, will not be reliably accurate in size and shape. To accommodate the inevitable variations in size and shape of the vessel and still provide a liquid tight fit between the cover and the mouth of the vessel, the side wall 12 has a relatively thin flexible lip 15 encircling it and projecting outwardly therefrom to have sealing engagement with the inner walls of the vessel as best shown in Figure 4, it being understood that the lip 15 is yieldingly deformable.

The body of the cover member also has a degree of resilience and deformability, so that it may be very readily installed on or removed from a mixing vessel, and as will be readily apparent since the cover is of one unitary construction it is easily kept clean.

The cross sectional shape of the cover member which is best illustrated in Figure 3, is of special significance. Two very important results flow from it. First, it will be seen that the central aperture or port 9 is at the bottom of a conical recess or depression 16. This provides a funnel leading to the port to facilitate charging material into the mixing vessel. Second, the concave underside of the cover member described hereinbefore deflects materials flowing upwardly along the walls of the vessel back down into the center of the vessel and thereby produces a sort of vortex into which the central aperture or port 9 opens.

The combination of the funnel-like entrance to the charging port or aperture and the deflection of the materials away from the mouth of the port greatly facilitates the introduction of ingredients into the vessel while the machine is in operation, a procedure made possible by the fact that the close fit of the cover with the sides of the vessel prevents leakage at the edge of the cover.

As noted hereinbefore, the port 9 is adapted to be closed by the plug 10, which is of inverted cup shape so that it may be used as a measure, especially for liquid ingredients. The plug fits into the port and has a flange 17 which seats upon the sloping wall of the conical depression 16, the underside of the flange being frusto-conical to have surface-to-surface engagement with the wall of the depression.

The plug may be secured in place by a bayonet connection with the cover member. This connection comprises a pair of oppositely projecting radial lugs 18 on the side wall of the plug 10, and a pair of opposite cam tracks 19 formed on the bottom of the boss 13, and along which the lugs travel upon rotation of the plug from its position of insertion and removal, in which position its lugs align with entrance slots 20 in opposite sides of the port 9. With the lugs 18 aligned with these slots the plug may be inserted into the port and rotated to slide the lugs up along the curved cam tracks and draw the plug firmly down into sealing engagement with the cover member.

The sides of the slots 20 opposite the bottom of the curved cam tracks prevent counterclockwise rotation of the plug (when viewed from above) so that upon insertion of the plug, only clockwise rotation thereof is possible; and to limit rotation in this direction the upper ends of the cam tracks terminate in abrupt shoulders 21. Preferably the side walls of the plug are fluted or knurled above its flange 17 as at 22 to facilitate rotation of the plug.

It is necessary that the interior of the mixing vessel be vented and to provide for such venting without allowing the contents of the vessel to be thrown out and in a manner facilitating the cleaning of the vents, the underside of the plug flange 17 has diametrically opposite portions thereof cut away as at 23. When the plug is in position in the cover member these cut away portions 23 form diametrically opposite spaces between the conical surface of the depression 16 and the flange 17 of the plug. The location of the cut out portions 23 with respect to the lugs 18 is such that when the plug is installed on the cover and rotated clockwise to its secured position these spaces resulting from the cut out portions 23 align with the lug slots 20 as best seen in Figure 5 to provide a tortuous passage through which the mixing vessel can breathe without danger of having its contents expelled. This manner of providing the necessary vents also has the advantage of easy cleaning.

From the foregoing description taken together with the accompanying drawing it will be readily apparent that this invention provides a closure for the mixing vessel of a food comminuting and blending machine which may be readily installed upon and removed from the vessel, is easily cleaned, and when in position on the vessel makes a liquid tight connection therewith despite variations in the size and shape of the vessel.

What is claimed as my invention is:

1. In combination: an open topped mixing vessel having an agitator in the bottom thereof, operation of the agitator causing the contents of the vessel to flow upwardly along the sides thereof; a cover member removably fitted to the open top of the vessel, said cover member having a thin side wall portion depending therefrom and telescoped into the vessel; a thin resilient lip encircling and projecting laterally from said side wall portion engageable with the walls of the vessel to provide a liquid tight connection between the sides of the vessel and the cover member; a central boss depending from the underside of the cover member; the underside of the cover member between its side wall position and the boss being concavely shaped and merging smoothly with the side wall portion and the boss to deflect the contents of the vessel flowing upwardly along its walls down into the center of the vessel and away from the bottom of the central boss; the cover member having an access port opening down through its central boss; and a removable plug closing said access port.

2. The closure of claim 1 further characterized by the fact that the top side of the cover member is shaped to provide a funnel-like depression leading to the access port; by the provision of a flange encircling the plug, the underside of said flange being of frusto-conical shape to have surface-to-surface engagement with the side of the funnel-like depression; and cooperating means on the cover member and the plug to draw the plug down tightly into the cover member in consequence of relative rotation in one direction between said parts.

References Cited in the file of this patent

UNITED STATES PATENTS

| | | |
|---|---|---|
| 38,635 | Weaver et al. | May 19, 1863 |
| 1,598,870 | Merry | Sept. 7, 1926 |
| 1,946,981 | Lower | Feb. 13, 1934 |
| 2,155,811 | Tredup | Apr. 25, 1939 |
| 2,352,232 | Strauss | June 27, 1944 |
| 2,603,218 | Rane | July 15, 1952 |
| 2,698,164 | Lamb | Dec. 28, 1954 |